July 6, 1926.
H. C. PRIEBE
CAR TRUCK
Filed August 3, 1925
1,591,052
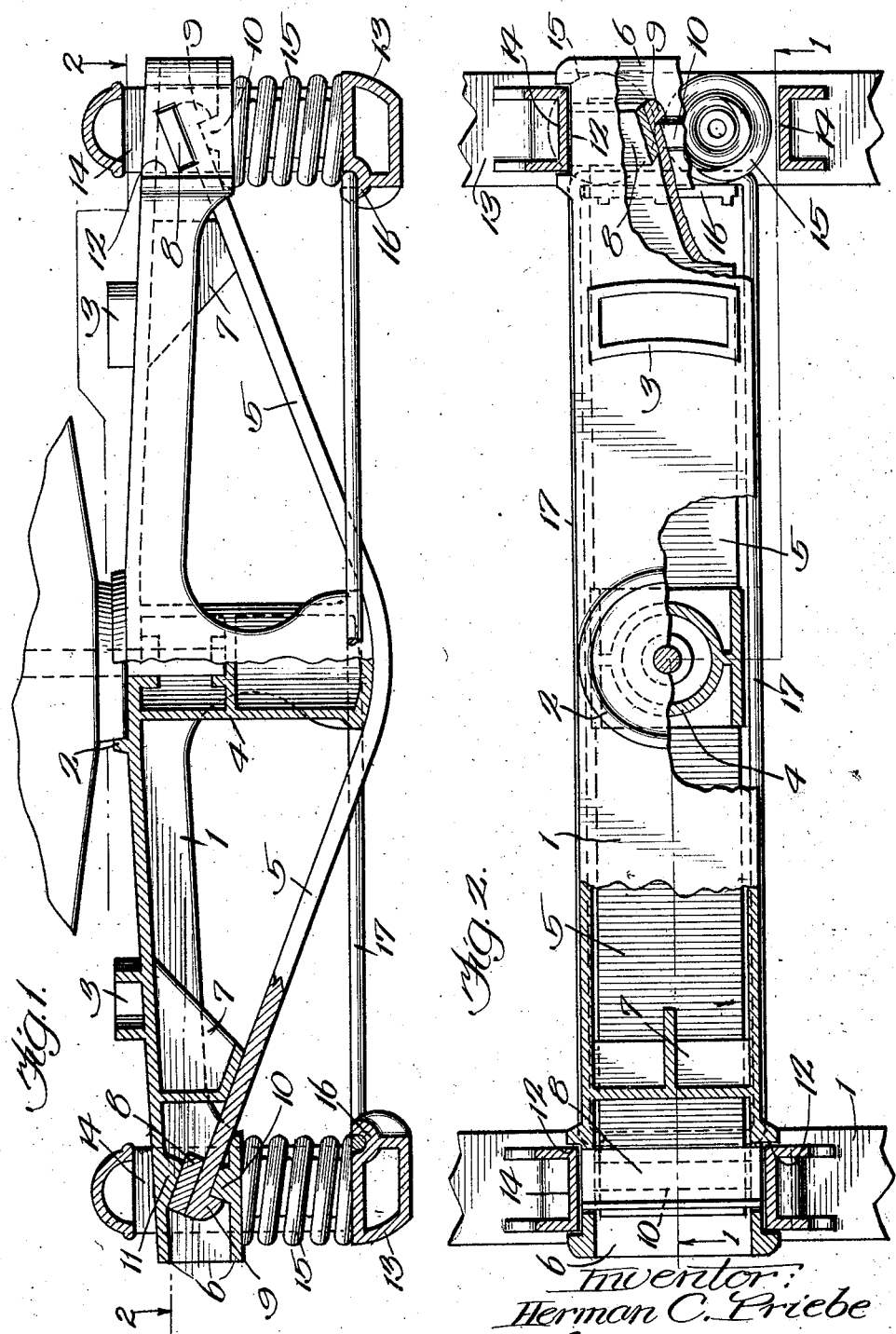
Inventor:
Herman C. Priebe Patented July 6, 1926.

1,591,052

UNITED STATES PATENT OFFICE.

HERMAN C. PRIEBE, OF BLUE ISLAND, ILLINOIS.

CAR TRUCK.

Application filed August 3, 1925. Serial No. 47,884.

My invention relates to car trucks, the invention having for its objects the provision of improved means for assembling the center bearing carrying members of truck bolsters with the underlying straps and a construction whereby the side frames take part in maintaining the assembly of these truck bolster members. In carrying out this object of my invention at least one end of the center bearing carrying member of a truck bolster, and preferably each end thereof, is formed with a sleeve that receives the contiguous end of the underlying strap and a key passing through the sleeve into holding engagement with the strap. The interior of the sleeve and the adjacent end of the strap have interengaging holding formations. The key engages the strap and sleeve to maintain these holding formations in locking relation. The adjacent side frame has a portion which prevents the removal of the key, the side frame thus taking part in maintaining the assembly of these two truck bolster members, though the invention is not to be thus limited. I also provide improved means for connecting the frames.

The invention will be more fully explained in connection with the accompanying drawing in which Fig. 1 is a view in elevation, partially in section on line 1—1 of Fig. 2, illustrating the preferred embodiment of the invention, a portion of the center bearing being also illustrated; and Fig. 2 is a sectional view on line 2—2 of Fig. 1.

The truck bolster member 1 is preferably cast in one integral structure with its center bearing socket 2, the side bearing elements 3, and the strut member 4 underlying the member 1 and the socket thereof. A strap 5 underlies the strut member and passes at its ends into the bores of sleeves 6 formed at the ends of the center bearing carrying member 1. Lugs 7 depend from the bolster member 1, these lugs being between and adjacent the sleeves and engaging the top side of the strap to hold it down.

Keys 8 are passed laterally through openings that are formed in the sides of the sleeves, these keys desirably engaging the top side of the strap at the ends of the strap. The strap is formed with downwardly extending transverse horizontal ridges 9 at its ends. The sleeves are formed with upwardly extending transverse horizontal ridges 10 in the bores thereof. These ridges form hooks, the hooks upon the strap engaging the hooks that are provided within the sleeves. The keys being interposed between the top side of the strap 11 formed upon and within the upper portions of the sleeves hold the strap and the bolster member 1 in firm assembly. The keys are desirably in the form of flat bars arranged parallel with the ends of the strap, whereby any tendency to shearing strains between the keys and strap is resisted.

The center bearing carrying member 1 of the truck bolster is formed with upright grooves 12 at the sides of each sleeve, the openings in the sides of the sleeves that receive the keys 8 establishing communication between the bores of the sleeves and said grooves whereby the keys may be passed transversely through the sleeves. Side frames 13 are provided, these side frames having upright portions 14 that are received in the grooves 12 whereby the center bearing carrying member 1 serves to assemble the upper portions of the side frames and whereby withdrawal of the keys is prevented after the truck bolster and side frames are assembled.

The lower portions of the side frames carry truck bolster supporting springs 15. These springs overlie upwardly facing hooks 16 which receive the ends of a link 17 whereby the lower portions of the side frames are assembled. These hooks closely underlie the springs to enable the springs to hold the link ends in said hooks.

Changes may be made without departing from the invention.

Having thus described my invention, I claim:—

1. A truck bolster including the center bearing carrying member thereof having a sleeve at one end and formed with upright grooves at the sides of the sleeve, said sleeve having key receiving openings in the sides and communicating with the bore of the sleeve and said grooves; a strut member underlying the aforesaid member; a strap underlying the strut member and assembled at its ends with the center bearing carrying member, one end of the strap entering the bore of said sleeve, said sleeve and strap having holding portions at one side of the strap in the form of transverse horizontal ridges; a key received in the bore and side openings of said sleeve and interposed between the strap and a portion of the sleeve on the side of the strap opposite said holding portions; and side frames assembled with the ends of said bolster and one having portions received in said grooves and positioned to obstruct withdrawal of said key.

2. A truck bolster including the center bearing carrying member thereof having a sleeve at one end and formed with an upright groove at a side of the sleeve, said sleeve having a key receiving opening in a side and communicating with the bore of the sleeve and said groove; a strut member underlying the aforesaid member; a strap underlying the strut member and assembled at its ends with the center bearing carrying member, one end of the strap entering the bore of said sleeve, said sleeve and strap having holding portions at one side of the strap in the form of transverse horizontal ridges; a key received in the bore and side opening of said sleeve and interposed between the strap and a portion of the sleeve on the side of the strap opposite said holding portions; and side frames assembled with the ends of said bolster and one having a portion received in said groove and positioned to obstruct withdrawal of said key.

3. A truck bolster including the center bearing carrying member thereof having a sleeve at one end, said sleeve having a key receiving opening formed in a side of and communicating with the bore of the sleeve; a strut member underlying the aforesaid member; a strap underlying the strut member and assembled at its ends with the center bearing carrying member, one end of the strap entering the bore of said sleeve, said sleeve and strap having holding portions at one side of the strap in the form of transverse horizontal ridges; a key received in the bore and side opening of said sleeve and interposed between the strap and a portion of the sleeve on the side of the strap opposite said holding portions; and side frames assembled with the ends of said bolster and one having a portion positioned to obstruct the withdrawal of the key.

4. A truck bolster including the center bearing carrying member thereof having a sleeve at one end and formed with upright grooves at the sides of the sleeve, said sleeve having key receiving openings in the sides and communicating with the bore of the sleeve and said grooves; a strut member underlying the aforesaid member; a strap underlying the strut member and assembled at its ends with the center bearing carrying member, one end of the strap entering the bore of said sleeve, said sleeve and strap having holding portions at one side of the strap; a key received in the bore and side openings of said sleeve and interposed between the strap and a portion of the sleeve on the side of the strap opposite said holding portions; and side frames assembled with the ends of said bolster and one having portions received in said grooves and positioned to obstruct withdrawal of said key.

5. A truck bolster including the center bearing carrying member thereof having a sleeve at one end and formed with an upright groove at a side of the sleeve, said sleeve having a key receiving opening in a side and communicating with the bore of the sleeve and said groove; a strut member underlying the aforesaid member; a strap underlying the strut member and assembled at its ends with the center bearing carrying member, one end of the strap entering the bore of said sleeve, said sleeve and strap having holding portions at one side of the strap; a key received in the bore and side opening of said sleeve and interposed between the strap and a portion of the sleeve on the side of the strap opposite said holding portions; and side frames assembled with the ends of said bolster and one having a portion received in said groove and positioned to obstruct withdrawal of said key.

6. A truck bolster including the center bearing carrying member thereof having a sleeve at one end, said sleeve having a key receiving opening formed in a side of and communicating with the bore of the sleeve; a strut member underlying the aforesaid member; a strap underlying the strut member and assembled at its ends with the center bearing carrying member, one end of the strap entering the bore of said sleeve, said sleeve and strap having holding portions at one side of the strap; a key received in the bore and side opening of said sleeve and interposed between the strap and a portion of said sleeve on the side of the strap opposite said holding portions; and side frames assembled with the ends of said bolster and one having a portion positioned to obstruct the withdrawal of the key.

7. A truck bolster including the center bearing carrying member thereof having a sleeve at one end and formed with upright grooves at the sides of the sleeve, said sleeve having key receiving openings in the sides and communicating with the bore of the sleeve and said grooves; a strut member underlying the aforesaid member; a strap underlying the strut member and assembled at its ends with the center bearing carrying member, one end of the strap entering the bore of said sleeve, said sleeve and strap having holding portions at one side of the strap in the form of transverse horizontal ridges, and a key received in the bore and side openings of said sleeve and interposed between the strap and a portion of the sleeve on the side of the strap opposite said holding portions.

8. A truck bolster including the center bearing carrying member thereof having a sleeve at one end and formed with an upright groove at a side of the sleeve, said sleeve having a key receiving opening in a side and communicating with the bore of the sleeve and said groove; a strut member underlying the aforesaid member; a strap underlying the strut member and assembled at its ends with the center bearing carrying member, one end of the strap entering the bore of said sleeve, said sleeve and strap having holding portions at one side of the strap in the form of transverse horizontal ridges; and a key received in the bore and side opening of said sleeve and interposed between the strap and a portion of the sleeve on the side of the strap opposite said holding portions.

9. A truck bolster including the center bearing carrying member thereof having a sleeve at one end and formed with upright grooves at the sides of the sleeve, said sleeve having key receiving openings in the sides and communicating with the bore of the sleeve and said grooves; a strut member underlying the aforesaid member; a strap unlerlying the strut member and assembled at its ends with the center bearing carrying member, one end of the strap entering the bore of said sleeve, said sleeve and strap having holding portions at one side of the strap; and a key received in the bore and side openings of said sleeve and interposed between the strap and a portion of the sleeve on the side of the strap opposite said holding portions.

10. A truck bolster including the center bearing carrying member thereof having a sleeve at one end and formed with an upright groove at a side of the sleeve, said sleeve having a key receiving opening in a side and communicating with the bore of the sleeve and said groove; a strut member underlying the aforesaid member; a strap underlying the strut member and assembled at its ends with the center bearing carrying member, one end of the strap entering the bore of said sleeve, said sleeve and strap having holding portions at one side of the strap; and a key received in the bore and side opening of said sleeve and interposed between the strap and a portion of the sleeve on the side of the strap opposite said holding portions.

In witness whereof, I hereunto subscribe my name.

HERMAN C. PRIEBE.